Jan. 17, 1961     G. F. LENTZ ET AL     2,968,083

HOT PATCHING OF REFRACTORY STRUCTURES

Filed Sept. 21, 1956

INVENTORS
GEORGE F. LENTZ
WILLIAM H. FINKELDEY
BY Pollard, Johnston
Smythe & Robertson
ATTORNEYS.

United States Patent Office 2,968,083
Patented Jan. 17, 1961

2,968,083

HOT PATCHING OF REFRACTORY STRUCTURES

George F. Lentz, 135 S. 2nd St., Quakertown, Pa., and William H. Finkeldey, 55 Scenic Drive, Hastings on Hudson, N.Y.

Filed Sept. 21, 1956, Ser. No. 611,261

10 Claims. (Cl. 25—155.5)

The present invention relates to the patching or sealing of cracks, fissures or openings developing in hot refractory structures or of corroded or eroded areas on the surfaces of such structures, for example, in order to repair deteriorated wall areas of boiler settings, metal melting and billet heating furnaces, calciners, cement kilns, retorts, zinc refining columns, reaction boats and vessels, and the like.

The refractory walls or roofs of furnaces or the refractory linings of chambers used for heating retorts and vessels may be of built-up construction, that is, formed of refractory bricks or elements cemented together with suitable mortar, or such refractory walls or linings may be formed of bulk refractory materials mixed with sufficient water and water soluble addition agents to provide a plastic mass that can be rammed, either by hand or with pneumatic hammers, into suitable shaped forms that can be removed after the refractory mass has set. Similarly, refractory retorts of various shapes and sizes can be formed either by the above mentioned built-up construction or in forms, or such retorts can be molded as separate vessels and fired in a furnace or kiln to produce vessels with refractory walls that are sound, homogenous and monolithic.

When refractory structures of the kind mentioned above are heated to their normal operating temperatures, thermal stresses and shocks are imposed thereon and ultimately produce cracks or fissures in the walls of the furnace, retort or vessel. Such cracks become progressively larger until, in time, it becomes necessary to replace or renew the refractory walls of the furnace, retort or vessel. The cost of such replacement is a major item to be considered in the cost of maintaining boilers, metal melting and billet heating furnaces, calciners, cement kilns, retorts, zinc refining columns, reaction boats and vessels and the like.

Various methods and compounds have been developed heretofore for use in patching the cracks and fissures that develop in refractory walls. Known techniques usually require the mixing of water with the refractory patching compounds to form a mix having sufficient plasticity to permit the ramming, troweling or blowing thereof by compressed air onto the surface, or into the crack, to be repaired. If such patching is attempted while the refractory wall is at or near its normal operating temperature, severe thermal shocks result from the contact of the cold mix of refractory patching compound and water with the hot refractory wall. Further, the adherence of the patching compound with the hot refractory wall is poor, and the patch itself has a porous structure resulting from the explosive escape from the patch of steam generated when the wet patching mix is applied to the hot refractory wall. If, on the other hand, the refractory wall to be repaired is allowed to cool so that the patch can be applied thereto at room temperature, valuable operating time is lost in cooling the refractory wall, prior to applying the patch, also in thereafter returning the furnace, retort or the like to its normal operating temperature, and considerably more fuel is required to reheat the furnace, retort or the like than would be required to merely maintain the normal operating temperature. The very process of cooling and reheating the furnace, retort or the like often has a destructive effect upon the refractory which will generate cracks or shorten the life of the structure. Furthermore, when the patching mix of refractory compounds and water is rammed or troweled or blown by compressed air into, or onto, the refractory wall surface to be repaired at room temperature, only a relatively weak bond is obtained between the patching compound and the original refractory material of the wall or surface to which the patch is applied, and old cracks or fissures reappear in the repaired refractory wall or surface upon reheating of the latter to its normal operating temperature, probably by reason of differences between the rates of thermal expansion of the patch and the original refractory material, respectively, and also by reason of the breakdown of the water of crystallization frequently included in the constituents of the patching compounds.

Accordingly, it is an object of the present invention to effect the desired durable patching of refractory walls or surfaces of high temperature furnaces, retorts, zinc refining columns and the like while the refractory structures are at or near their normal operating temperatures, so that the expenses and the destructive effect of cooling and reheating the refractory structure may be eliminated.

Another object of the invention is to provide a method and an apparatus which will serve to produce strong and impervious patches permanently bonded to the hot refractory structure and reliably sealing any crack or fissure in the structure.

In accordance with an aspect of the invention, cracks, fissures or corroded or eroded areas appearing in or on the refractory walls of furnaces, retorts, zinc refining columns or the like, are repaired by spraying a molten or semi-molten refractory composition against the deteriorated area of the refractory wall or surface while the latter is at or near its normal high operating temperature, the sprayed refractory composition being so compounded that it will solidify immediately on the hot refractory wall by freezing thereon at the high operating temperature of the wall. The molten or semi-molten refractory composition is sprayed against the wall to be repaired with sufficient force to effect substantial impact and firm adherence of the composition to the hot refractory material of the wall, with penetration of the composition into any crack or fissure therein, prior to the solidification of the sprayed composition. Spraying of the refractory composition is continued until a dense patch thereof is built up on the hot refractory wall surface, covering the area to be repaired and having sufficient thickness and structural strength to resist spalling or erosion due to the passage thereover of products of combustion, as in a furnace, or of other products, as in retorts, zinc refining columns, chemical reaction vessels and the like.

Another feature of the invention resides in the spraying of the refractory patching composition through a flame of intense heat capable of instantaneously melting at least some of the constituents of the patching composition at a temperature substantially above the normal operating temperature of the wall or surface to be repaired so that, when the sprayed composition contacts the hot refractory wall or surface, the composition is solidified to form a fused patch which is impermeable and structurally sound.

Heretofore, a device, which is known as a "Schori metal powder spraying pistol or gun," has been provided for applying molten metal to metallic and non-metallic surfaces for the purpose of protection, repair or decoration, and, in such existing device a metal powder is aspirated by compressed air through the hottest portion of an oxy-acetylene flame which instantly melts the sprayed particles of metal powder and, at the same time, surrounds the latter with a substantially inert or reducing atmosphere. When the molten particles of metal powder are forcibly sprayed against the cool metallic or non-metallic surface to be protected, repaired or decorated thereby, the molten metal particles adhere to that surface and then cool to solidify on the latter.

In accordance with another aspect of this invention, a spraying gun or pistol of the described character is provided with an elongated water-cooled barrel and a water-cooled nozzle or head to permit the use thereof for the spraying of molten or semi-molten refractory patching compositions against a hot refractory surface within a furnace, or other heated chamber, the water-cooling of the elongated barrel and nozzle or head preventing damage to the structure of the spraying gun by the high temperatures existing within the furnace, or other heated chamber, and the elongated barrel permitting manipulation of the gun from outside of the furnace or heated chamber to dispose the nozzle or head at the proper location for spraying the molten or semi-molten refractory patching compositions against the deteriorated area of the refractory surface to build-up a permanent sealing patch on the latter.

A further object is to provide refractory patching compositions capable of being sprayed, in molten or semi-molten condition, against a hot refractory wall or surface to be repaired, and of there forming a solid impervious patch having an intimate and strong bond with the original refractory material of the repaired wall or surface.

An important feature of this aspect of the invention resides in the provision of refractory patching compositions in the form of fine particles of refractory materials having very high fusion temperatures, for example, fine particles of silicon carbide, coated with refractory materials having lower fusion temperatures, such as the type of compositions used for glazes, so that, when the refractory patching composition is sprayed through a hot flame, the layer or coating on each particle of refractory material having a high fusion temperature is made molten or semi-molten to securely bond the particles of high fusion temperature refractory material to each other and to a hot refractory wall or surface, against which the spray is directed, thereby to form a sound, impervious patch that is permanently bonded to the refractory wall or surface.

Such a composite patching composition may be prepared, for example, by fritting the several constituents into a more or less solid mass having each particle of silicon carbide, or other high fusion temperature refractory material, substantially coated or surrounded by the lower fusion temperature constituents. The resulting frit is then crushed, ground and screened to convert it into coated particles of a selected size range adapting it for effective use by spraying through a hot flame against a hot refractory wall or surface to be repaired.

The above, and other objects, features and advantages of the present invention, will be apparent in the following detailed description of illustrative embodiments thereof, which is to be read in connection with the accompanying drawings forming a part hereof, and wherein.

Figure 1:
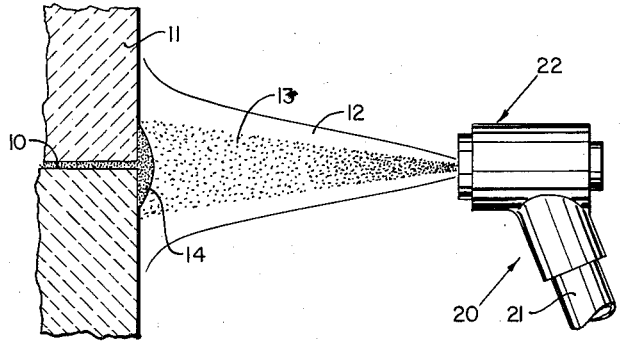
Fig. 1 is a diagrammatic representation of the patching of a crack or fissure in a refractory wall or surface, while the latter is at its normal operating temperature, in accordance with a method embodying the present invention.

With reference to Fig. 1 of the drawings, it will be seen that a crack or fissure 10 appearing in a hot refractory wall 11, for example, in a boiler, metal melting or billet heating furnace, calciner, cement kiln, retort, zinc refining column, reaction boat or vessel and the like, may be patched or sealed in accordance with the present invention, while the wall 11 is at its normal operating temperature, by spraying a refractory patching composition, in dry, finely divided condition, through a flame 12 of high temperature against the cracked area of the wall 11. At least one refractory constituent of the finely divided refractory patching composition has a melting or fusion temperature that is substantially less than the temperature of the flame 12, while the solidifying temperature of the composition, as a whole, is substantially greater than the normal operating temperature of the wall 11. Thus, as particles 13 of the powdered or finely divided refractory patching compound or composition are sprayed through the flame 12, at least one refractory constituent of the compound is rendered molten or semi-molten, and, when the sprayed particles contact the wall 11, where they arrive at a temperature substantially above the operating temperature of the refractory wall structure, the particles solidify or congeal in a strongly bonded relation to the wall structure and to each other, thus forming a dense, strong and impervious patch or lining.

The particles 13 of refractory patching compound or composition are sprayed against the wall 11 to be repaired with sufficient force to cause substantial penetration of the patching compound into the crack or fissure 10 and to effect initial adherence of the particles 13, having molten or semi-molten constituents, to the wall 11, and the hot spraying of the refractory patching compound against the cracked or defective area of the wall 11 is continued until a fused patch 14 is formed on the latter extending beyond the limits of the crack 10 and having sufficient thickness to provide the requisite structural strength and resistance to spalling or erosion by gaseous substances, for example, products of combustion, that may normally pass over the patched surface.

Since the sprayed patching compound is relatively small in volume and is exceedingly hot when it contacts the refractory wall, there is no danger that severe thermal shocks will occur in the wall which is at its normal operating temperature. Further, since the sprayed patching compound is in dry powdered condition and is rendered molten or semi-molten by the heat of the flame 12 through which it is made to travel, no water is required in the patching compound to attain a workable plasticity, as in the usual refractory patching mortars, and the absence of moisture in the patching compound avoids the explosive escape of steam upon contact with the hot refractory wall which has previously caused porosity in patches of the usual refractory patching mortars applied to hot refractory walls.

The refractory patching compounds used in connection with the above described method embodying the present invention have compositions which are preferably related to the compositions of the refractory materials forming the wall or surface to be repaired so that the thermal and mechanical characteristics of the patch will correspond to those of the original refractory materials to avoid any substantial change in the thermal characteristics of the patched wall, as well as to avoid the encouragement of the appearance of new cracks or fissures in the patched area. Thus, if the refractory wall is formed of refractory bricks or bulk materials containing a large proportion of silica, silicon carbide, alumina or other similar high temperature refractories, the patching compounds for use in connection therewith will preferably include similar large proportions of the corresponding high temperature refractory materials.

Further, the particular gases burned in the flame 12, to heat the particles 13 of the patching compound sprayed therethrough, depend, at least to some extent, upon the composition of the patching compound. In any case, the gases burned in the flame 12 must be capable of producing a flame that is sufficiently hot to melt at least one of the constituents of the sprayed refractory patching compound during the relatively brief period of the passage of particles 13 of the patching compound through the flame 12.

Preferably, the solidifying temperature of the sprayed refractory patching compound on the hot refractory wall should be at least approximately 150 to 200° F. higher than the normal operating temperature of the wall to prevent flowing of the sprayed compound away from the area of the wall to be patched or repaired.

The method embodying the present invention is particularly suitable for patching or repairing cracks, fissures and the like occurring in a refractory furnace structure normally operated at temperatures in the range of visible red heat or higher, that is, at temperatures of approximately 2200 to 2550° F., and above. It is particularly useful where the patch must be applied from within a heated chamber, for example, the combustion space of a boiler, or metal reducing furnace, or zinc refining column, or the like. When the dry powdered refractory patching compound or composition is sprayed against the wall to be repaired through a hot flame, for example, an oxy-acetylene or any other equivalent high temperature flame, located in a heated atmosphere, the rate of heat loss from the flame to the surrounding heated atmosphere is substantially less than the rate of heat loss from the same flame operating in an atmosphere at room temperature, so that the temperature of the flame can be maintained at a relatively high value to ensure the maximum effectiveness thereof in melting constituents of the powdered refractory patching compound as particles of the latter pass through the flame.

Figure 2:
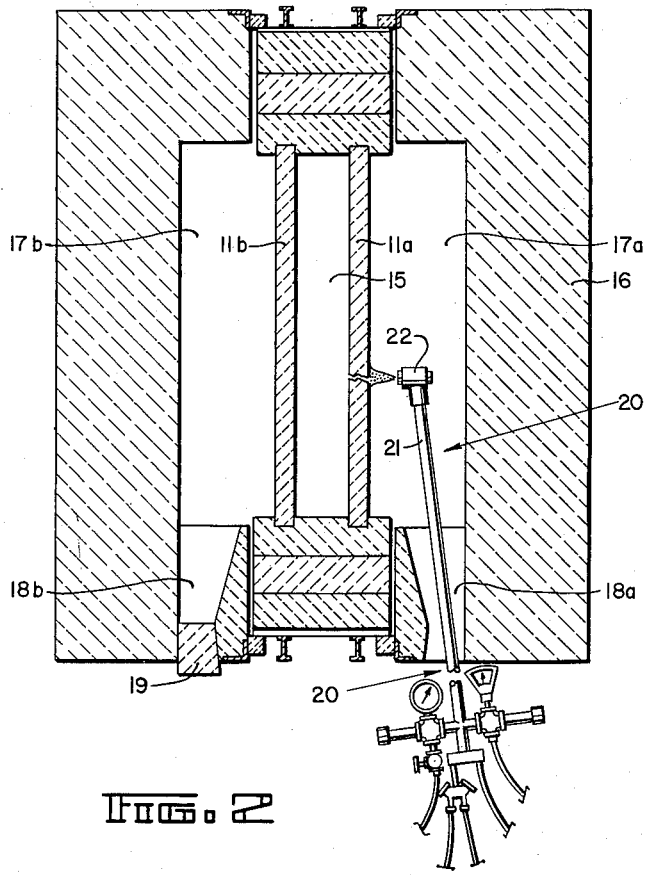
Fig. 2 is a horizontal sectional view of a metal reduction furnace, for example, for smelting zinc, and showing the manner in which cracks or fissures in the hot refractory walls of the retort can be repaired from within the adjacent combustion chamber by use of the method embodying the present invention.

Fig. 2 of the drawings illustrates the patching of a hot refractory wall in accordance with the present invention, from within a heated chamber or combustion space, for example, in a metal reduction or refining furnace or column. The furnace of Fig. 2 is of the vertical retort type particularly adapted for reduction and refining zinc and includes laterally spaced apart, vertical refractory walls 11a and 11b defining a reduction retort 15 therebetween, and an outer furnace wall structure 16 spaced laterally from the walls 11a and 11b to define combustion chambers 17a and 17b at the outer sides of the retort walls 11a and 11b respectively. If cracks develop in the refractory walls 11a and 11b or roof (not shown) of the reduction retort 15, valuable zinc vapors or molten zinc will escape from the retort into the adjacent combustion chamber. In order to permit patching of any crack occurring in the refractory structure of the retort 15 from within the adjacent combustion chamber 17a or 17b by the above described method, the outer furnace wall structure 16 is provided, at the front, with rows of ports 18a and 18b opening into the related combustion chambers at various elevations and normally closed by plugs 19, each of the plugs 19 being removable to permit the entry, through the related port, of a hot spray gun which is generally identified by the reference numeral 20 and is constructed so as to be particularly adapted for the practice of the described method within a heated chamber or space.

As seen in Fig. 2, the spray gun 20 includes an elongated cylindrical barrel 21 having a length greater than the distance across the refractory wall 11a or 11b from any one of the ports 18a or 18b, respectively, so that the barrel 21, when extended through an entry or access port of the furnace, is capable of reaching across the entire adjacent refractory wall to position the inner end of the barrel close to a crack occurring at any location in the refractory wall. The gun 20 further includes a head 22 having a generally cylindrical body.

A hot flame is to issue from the head 22, and a refractory patching compound in dry, powdered condition is also to be sprayed from the head through the hottest part of the flame. The gases to produce the desired hot flame are, for example, a suitable mixture of oxygen and acetylene.

Since the spray gun 20 is intended to be used in a heated atmosphere, for example, within a furnace combustion chamber or the like, it is necessary that both the barrel 21 and the head 22 be cooled, for example, by water circulated therethrough, so that operators of the gun can safely handle and manipulate the barrel and so that the gases will be shielded from the intense heat within the combustion chamber to avoid heating of the acetylene or other reaction gas to a decomposition or explosion temperature prior to emission from the nozzle member of the head 22.

Thus, a mixture of gases, for example, oxygen and acetylene, capable of producing a hot flame, is ejected from the head 22 and is ignited upon contact with the hot atmosphere in which a patching operation is to be performed, while a suitable dry, powdered patching compound is aspirated, by compressed air, out of the central passage of the head into, and through, the hot central part of the flame.

Dry, powdered refractory compounds or compositions provided in accordance with the present invention to effect the repair of cracked refractory walls and the like, while the latter are at or near their normal operating temperatures, generally include finely divided high temperature refractory materials similar to those making up the wall to be repaired, such as, for example, silicon carbide, silica mullite, alumina, chromite, zirconia, magnesia, magnesia-chromite and the like, which, by reason of their high fusion points or melting temperatures, are inadequately melted, if at all, during the spraying of the patching compound through a hot flame, for example, an oxy-acetylene flame. The material having a very high fusion or melting temperature is mixed with finely divided materials having relatively lower melting points or temperatures, for example, glazes and the like composed of various combinations of materials such as feldspar, flint, whiting, kaolin clay, bentonite, borax and soda ash, which, during passage through the hot flame, are rendered molten or fused to again solidify on the relatively cooler wall and, thereby, provide a dense, gas impervious and securely bonded patch on the latter of the high melting point refractory materials and the relatively low melting point materials.

In the following specific examples of the practice of the present invention, the high fusion or melting temperature constituent of the patching compounds used is provided by Silicon Carbide Dust Collector Fines, referred to as DCF, which is obtained from the Carborundum Company in the form of a dry powder having the following chemical analysis, wherein the proportions are given by weight:

| | Percent |
|---|---|
| Silicon carbide (SiC) | 89.60 |
| Silicon dioxide ($SiO_2$) | 4.20 |
| Aluminum oxide ($Al_2O_3$) | 2.05 |
| Calcium oxide (CaO) | .55 |
| Iron oxide ($Fe_2O_3$) | 1.65 |
| Ignition loss, mostly moisture | 1.80 |
| | 99.85 |

The lower melting refractory material or glaze constituent of the following examples is provided by various combinations of Tennessee Ball Clay, No. 89 Glaze, and No. 44 Glaze, all of which substances are available from the Carborundum Company in the form of dry powders.

It is to be understood that various other substances may be used as the respective constituents of the refractory patching compounds or compositions to be provided and used according to the present invention.

The above mentioned Tennessee Ball Clay has a fusion or melting temperature of 3300° F., and chemical analysis thereof indicates that it contains the following substances, the proportions of such substances being given by weight:

| | Percent |
|---|---|
| Silicon dioxide ($SiO_2$) | 47.00 |
| Aluminum dioxide ($Al_2O_3$) | 37.83 |
| Titanium dioxide ($TiO_2$) | 1.20 |
| Iron oxide (FeO) | .71 |
| Calcium oxide (CaO) | Trace |
| Potassium oxide ($K_2O$) | .10 |
| Solium oxide ($Na_2O$) | .20 |
| Magnesium oxide (MgO) | .20 |
| Ignition loss, moisture plus $CO_2$ | 12.50 |
| | 99.74 |

The above mentioned No. 89 Glaze has a fusion or melting temperature of approximately 2100 to 2200° F., and chemical analysis thereof indicates the presence therein of the following substances in the proportions given, which are by weight:

| | Percent |
|---|---|
| Feldspar ($K_2O.Al_2O_3.6SiO_2$) | 72.0 |
| Flint ($SiO_2$) | 9.0 |
| Whiting ($CaCO_3$) | 9.0 |
| Kaolin clay pulverized ($Al_2O_3.2H_2O.2SiO_2$) | 8.0 |
| Bentonite | 2.0 |
| | 100.0 |

The above mentioned No. 44 Glaze has a fusion or melting temperature of approximately 1600 to 1700° F., and chemical analysis thereof indicates the presence therein of the following substances in the proportions given, which are by weight:

| | Percent |
|---|---|
| Kaolin clay pulverized ($Al_2O_3.2H_2O.2SiO_2$) | 40.0 |
| Borax ($Na_2B_4O_7.10H_2O$) | 50.0 |
| Soda Ash, 58% light | 10.0 |

Example No. 1

In applying a patch to carborundum bricks having a gap of approximately 3/32 inch therebetween and heated to a temperature of 2300° F. in a heating furnace, 66% Silicon Carbide (DCF) and 34% No. 44 Glaze, by weight, are thoroughly mixed together and then passed through a Tyler U.S. No. 40 screen having .0164 inch openings and 35 mesh to the inch. The resultant fine, dry, powdered mixture is then fed to the spray gun so that the mixture is sprayed from the head of the gun at a rate of approximately 1 gram per second. Simultaneously, a suitable mixture of oxygen and acetylene is fed to the spray gun to provide a flame temperature of approximately 6300° F. through which the refractory patching compound is sprayed. During the patching operation, the head of the spray gun is held at a distance of approximately 6 inches from the refractory surface to be repaired. After spraying for a period of 60–90 seconds, a patch covering the gap between the bricks is produced, such patch being securely bonded to the original refractory material of the bricks and, further, being dense and impervious to gas even at pressures of 18 to 20 inches of $H_2O$.

Example No. 2

A mixture of 75% Silicon Carbide (DCF) and 25% No. 44 Glaze, by weight, prepared and applied in the manner specified in connection with Example No. 1, also produces a dense and gas impervious patch.

Example No. 3

A mixture of 80% Silicon Carbide (DCF) and 20% No. 44 Glaze, by weight, prepared and applied in the manner specified in connection with Example No. 1, produces a patch that is hard at a temperature of 2300° F., and that is dense and gas impervious, even at pressures of 18 to 20 inches $H_2O$.

Example No. 4

A mixture of 80% Silicon Carbide (DCF), 5% Tennessee Ball Clay and 15% No. 44 Glaze, by weight, is prepared and applied in the manner specified in connection with Example No. 1 and produces a patch that is hard at a temperature of 2300° F., and that is dense and gas impervious, even at pressures of 18 to 20 inches $H_2O$.

In each of the foregoing specific Examples 1 to 4, inclusive, the refractory patching compound is merely a dry, powdered mixture of the specified materials. However, it has been found that there is a tendency for the particles of refractory material, having high fusion or melting temperatures, to separate from the particles of refractory material, having relatively low fusion or melting temperatures, during the travel of the mixture through the long barrel of the spray gun and the passage of the head, possibly due to the different particle size and specific gravity of the various materials. Since the particles of refractory materials having high fusion or melting temperatures may not be melted during their relatively brief passage through the hot flame, the separation therefrom of the particles having relatively lower fusion or melting temperatures, which are melted by the flame, can result in a patch that is somewhat powdery or porous and imperfectly bonded to the surface being repaired.

Figure 3:
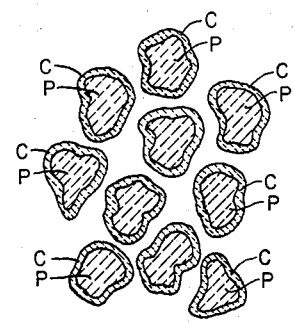
Fig. 3 is a diagrammatic, greatly enlarged, sectional view of particles of a fritted refractory patching composition embodying the present invention.

It has been found that patches of excellent quality can be produced more consistently in the practice of the invention by carrying out the described hot patching method with the use of finely divided fritted mixtures of the refractory constituents of the refractory patching compounds. In the preparation of such fritted compositions, powders of the several constituents are heated together until a lower melting constituent fuses sufficiently to form a dense, coherent mass of the mixture, and this mass is cooled and then suitably crushed and ground. In the fritted composition, as shown diagrammatically in Fig. 3, discrete particles or agglomerates P of the relatively infusible refractory constituent are partially or totally enveloped in coatings of a refractory material having a relatively lower fusion temperature. Thus, the particles of the fritted composition comprise coatings which become fused or molten during passage through the hot flame, thereby to ensure the bonding of the particles to the hot refractory surface being repaired and to each other.

In fritting the mixture of refractory materials making up the patching compound, it has been found that the temperature at which the mixture it fritted preferably should not substantially exceed the fusion or melting temperature of those materials in the mixture having the lowest fusion or melting temperature. If the fritting temperature does substantially exceed the lowest fusion or melting temperature of the materials in the mixture, materials contributing to the bonding or adherence strength of the final patch may escape, as fumes, from the mixture during the fritting thereof.

Example No. 5

Initially, 80% Silicon Carbide (DCF), 15% No. 44 Glaze and 5% Tennessee Ball Clay, by weight, are thoroughly mixed together and then passed through a Tyler U.S. No. 40 screen having 35 mesh to the inch and .0164 inch openings. The resulting fine powdered mixture is then placed in a graphite crucible and heated, preferably in an electric furnace, to a temperature of 1800° F., such temperature being maintained for a period of approximately 15 minutes so that the mixture becomes slightly plastic. Then the heated mixture is removed from the crucible and crushed manually with a hammer against a steel plate which cools the mixture very rapidly as it is being crushed. Thereafter, the roughly crushed fritted mixture is placed between two pieces of tightly woven cloth and is again crushed with a hammer, this procedure being preferred rather than passage between crushing rolls which would have a tendency to break away the fused or glazed materials of relatively lower fusion temperature coating the particles of material of high fusion temperature. The crushed, fritted mixture is then screened through a Tyler U.S. No. 100 screen, having 100 mesh to the inch and .0058 inch openings, before being fed to the spray gun.

Using the flame spraying gun, the above described fritted mixture of refractory materials is applied to the surface of slightly spaced apart carborundum bonded refractory bricks heated, in a furnace, to a temperature of 2300° F., by spraying the fritted mixture through an oxyacetylene flame having a temperature of approximately 6300° F. The fritted mixture is sprayed at a rate of approximately 1 gram per second, and spraying continues for 60 to 90 seconds, or until 75 to 80 grams of the patching compound or mixture have been applied to form a suitable patch filling and covering the crevice between the refractory bricks.

The resulting patch is strong and hard at 2300° F., that is, at the normal operating temperature of the furnace, as well as when the furnace is cooled, and has a strong bond to the refractory bricks both at the operating temperature (2300° F.) and at room temperature. Further, the patch is dense and impervious to gas under pressures of at least 18 to 20 inches $H_2O$.

*Example No. 6*

A mixture of 75% Silicon Carbide (DCF) and 25% No. 44 Glaze, by weight, is fritted at 1800° F. and otherwise prepared and applied in the manner described in Example No. 5, and produces a patch that is also hard at 2300° F., strong at the latter temperature as well as at room temperature, and dense and impervious to gas at pressures of at least 18 to 20 inches $H_2O$.

*Example No. 7*

A mixture of 50% Silicon Carbide (DCF), 25% No. 89 Glaze, 15% No. 44 Glaze and 10% Tennessee Ball Clay, by weight, is fritted at 1800° F. and otherwise prepared and applied to carborundum bonded refractory bricks in the manner described in Example No. 5. The bonding or adherence of the hot sprayed material on the bricks is excellent, even at brick temperatures of 2400° F., and the resulting patch is strong and hard on the bricks at temperatures up to 2350° F. as well as at room temperature. Further, the patch is dense and impervious to gas under pressures of at least 18 to 20 inches $H_2O$. Readings taken with an optical pyrometer indicated that, when the patch had been applied to the carborundum bonded bricks, the temperature of the latter had increased approximately 100 to 150° F., that is to a temperature of 2400 to 2450° F.

*Example No. 8*

A mixture of 60% Silicon Carbide (DCF), 15% No. 89 Glaze, 15% No. 44 Glaze, and 10% Tennessee Ball Clay, by weight, is fritted at 1800° F. and otherwise prepared and applied to carborundum bonded refractory bricks in the manner indicated in Example No. 5. The resulting patch on the bricks is very strong either at room temperature or at temperatures up to 2450° F. The patch hardens at 2400° F., and the bonding and adherence of the patching material to the bricks is excellent at room temperature as well as at temperatures up to 2450° F. Readings taken with an optical pyrometer indicate that the temperatures of the bricks rise approximately 100 to 150° F. above the normal operating temperature of 2300° F. following the application of the patch to the bricks. Further, the patch is dense and impervious to gas under pressures of at least 18 to 20 inches $H_2O$.

*Example No. 9*

The same fritted mixture as that indicated in Example No. 8 is applied to cut, carborundum bonded refractory bricks, rather than to whole bricks, and the resulting patch has substantially the same characteristics as those recited in Example No. 8, with the exception that readings taken with an optical pyrometer indicate that the operating temperature of the cut bricks increases approximately 150 to 200° F. above the normal operating temperature of 2300° F. following application of the patch.

*Example No. 10*

The same fritted mixture as that indicated in Example No. 8 is prepared and applied in the same way, but to fire clay bricks. The hot sprayed material has excellent bonding or adherence to the fire clay bricks at 2350° F. and produces a patch that is hard at that temperature. After the patch is applied, the temperature of the fire clay bricks increases approximately 50° F. above the normal operating temperature of 2300° F.

*Example No. 11*

55% Silicon Carbide (DCF), 10% Tennessee Ball Clay, 15% No. 89 Glaze and 20% No. 44 Glaze, by weight, are thoroughly mixed and passed through a Tyler U.S. No. 40 screen having 35 mesh to the inch and .0164 inch openings. The resulting fine powdered mixture is there fritted at 1800° F. for 20 minutes in small No. 1 graphite crucible, preferably by heating in an electric furnace. Thereafter, the fritted mixture is crushed with mortar and pestle and screened through a Tyler U.S. No. 100 screen having 100 mesh to the inch and .0058 inch openings.

The resulting dry, powdered, fritted refractory patching compound has the following chemical analysis, the proportions given being by weight:

| | Percent |
|---|---|
| Loss on ignition | 0.21 |
| Silicon carbide (SiC) | 40.04 |
| Silica ($SiO_2$) | 26.62 |
| Alumina ($Al_2O_3$) | 14.52 |
| Iron oxide ($Fe_2O_3$) | 1.67 |
| Boric oxide ($B_2O_3$) | 6.29 |
| Total alkalies calculated as sodium oxide ($Na_2O$) | 7.29 |
| Spectrographic analysis (Ni) approx. | 0.50 |
| | 97.14 |

Approximately 15% of the original materials are lost in fritting, and the fritted mixture or compound has a specific gravity of 2.647. Further, the fritted material, as a whole, is reduced to a melted or liquefied condition at a temperature of approximately 3200 to 3500° F. and, thereafter, solidifies at a temperature of approximately 2600 to 2800° F.

The above described fritted compound is used for applying a patch to the surface, within a furnace, of a wall formed of silicon carbide bricks containing 12-14%, by weight, of Tennessee Ball Clay, stated by the manufacturer to be useful at temperatures up to 4000° F. With the furnace operating at 2400° F., the fritted compound is fed to the previously described spray gun, while a mixture of oxygen and acetylene is simultaneously supplied to produce a flame temperature of 6300° F. within the furnace through which the fritted compound is sprayed. The temperature of the spray is approximately 5000 to 5300° F., as a result of using 2.5 to 3.5 cu. feet of compressed air per minute to convey and spray the fritted compound at a rate of approximately 17 grams per minute.

With the head of the hot patching spray gun held at a distance of approximately 6 inches from the surface to be patched, the fritted patching compound is rendered molten while passing through the flame and solidifies, upon striking against the relatively cooler surface of the silicon carbide bricks which are at a temperature of 2400° F., and, thus, at least 200° F. cooler than the solidification temperature of the patching compound. Spraying of the patching compound continues until a patch is deposited on the surface of the bricks that more than covers the crack or fissure therebetween. The patch is strong, hard and securely bonded to the bricks at the normal operating temperature (2400° F.) as well as at room temperature, and the patch is also dense and impervious to gas at both temperatures.

It will be apparent that, in all of the foregoing specific examples, refractory patching compounds are provided that melt during the spraying thereof toward a hot refractory surface and that solidify at temperatures exceeding the normal operating temperature of the refractory surface so that, upon contact with the latter, the patching compounds congeal or solidify to form dense, gas impervious patches that are hard at the normal operating temperatures.

The techniques disclosed herein have valuable applications not only for the repairing of locally deteriorated areas of hot refractory structures but also for the building up or lining of refractory articles or structures previously brought to a high temperature approximating the temperature to which they will be subjected in actual use. The term "patching" as used herein is intended to include such building up or lining of preformed refractory structures, for example, in the course of construction of a complete furnace wall, reaction vessel, or the like, as well as the repairing of refractory structures already in actual use.

Although particular compounds, apparatus and methods embodying the present invention have been described in detail herein with reference to the accompanying drawings, such embodiments are merely illustrative, and it is to be understood that the invention is not limited thereto and that various changes and modifications may be effected in such embodiments without departing from the scope or spirit of the invention defined in the appended claims.

What is claimed is:

1. The method of patching a solid refractory structure that normally is heated to a temperature at least approaching the range of visible red heat, which comprises directing onto said structure while it is heated to such a temperature a spray of finely divided particles of an incombustible refractory composition that is solid at the temperature of said structure, heating said particles in said spray to a high temperature sufficient to melt at least one refractory constituent of said particles therein before said particles reach said structure, and congealing the sprayed particles together as they accumulate on said heated structure to form a dense solid patch thereon.

2. The method of patching a heated refractory structure that normally is heated to a temperature at least approaching the range of visible red heat, which comprises spraying a finely divided incombustible refractory composition that is solid at the normal temperature of said structure into a flame the temperature of which is sufficient to melt at least partially the particles of said composition within the flame, thus forming in said flame a spray of at least partially molten particles of said composition, and directing said spray onto said heated structure and congealing said particles into a dense solid patch thereon as said particles accumulate on said structure.

3. The method of patching a heated solid refractory structure that normally is heated to a temperature at least approaching the range of visible red heat, which comprises spraying a finely divided incombustible refractory composition that is solid at the normal temperature of said structure into an oxy-acetylene flame the temperature of which is sufficient to melt at least partially the particles of said composition within the flame, thus forming in said flame a spray of at least partially molten particles of said composition at a temperature higher than said temperature of said heated structure, and directing said spray onto said heated structure to congeal said particles into a dense solid patch thereon as said particles accumulate on said structure.

4. The method of patching a heated solid refractory structure that normally is heated to a temperature at least approaching the range of visible red heat, which comprises spraying a finely divided incombustible refractory composition that is solid at the normal temperature of said structure into a flame the temperature of which is sufficient to melt at least partially the particles of said composition within the flame, thus forming in said flame a spray of at least partially molten particles of said composition at a temperature higher than said temperature of said heated structure, and directing said spray onto said heated structure to congeal said particles into a dense solid patch thereon as said particles accumulate on said structure, said composition being a finely divided mixture of highly refractory material substantially corresponding in its refractory qualities and fusion temperature to the basic refractory material of said structure and at least one refractory material that is composed predominantly of metallic oxides and fuses at a temperature substantially lower than the fusion temperature of said highly refractory material.

5. The method of patching a heated solid refractory structure that normally is heated to a temperature at least approaching the range of visible red heat, which comprises spraying a finely divided incombustible refractory composition that is solid at the normal temperature of said structure into a flame the temperature of which is sufficient to melt at least partially the particles of said composition within the flame, thus forming in said flame a spray of at least partially molten particles of said composition at a temperature higher than said temperature of said heated structure, and directing said spray onto said heated structure to congeal said particles into a dense solid patch thereon as said particles accumulate on said structure, said composition being a finely divided fritted mixture of highly refractory material substantially corresponding in its refractory qualities and fusion temperature to the basic refractory material of said structure and at least one refractory material that is composed predominantly of metallic oxides and fuses at a temperature substantially lower than the fusion temperature of said highly refractory material, the particles of said mixture comprising cores of said highly refractory material enveloped in coatings of said material of lower fusion temperature.

6. The method of patching a heated solid refractory structure, as in a heated furnace chamber, which comprises directing onto said structure through an oxyacetylene flame a spray of finely divided particles of a refractory composition that is solid at the operating temperature of said structure, said composition consisting essentially of a major proportion of highly refractory material from the group consisting of silicon carbide, silica mullite, alumina, chromite, zirconia, magnesia and magnesia-chromite and a minor proportion of refractory glaze material composed predominantly of metallic oxides that melt at the temperature imparted to said spray in said flame, melting said particles at least in part, as they pass through said flame, and congealing the sprayed particles together as they accumulate on said structure to form a dense solid patch thereon.

7. The method of patching a heated solid refractory structure, as in a heated furnace chamber, which comprises directing onto said structure through an oxy-acetylene flame a spray of finely divided particles of a fritted refractory composition that is solid at the operating temperature of said structure, said particles consisting essentially of cores of highly refractory material from the group consisting of silicon carbide, silica mullite, alumina, chromite, zirconia, magnesia and magnesia-chromite enveloped in coatings of refractory glaze material composed predominantly of metallic oxides that melt at the temperature imparted to said spray in said flame, melting said particles, at least in part, as they pass through said flame, and congealing the sprayed particles together as they accumulate on said structure to form a dense solid patch thereon.

8. The method of patching a heated solid refractory structure, as in a heated furnace chamber, which comprises directing onto said structure through an oxy-acetylene flame a spray of finely divided particles of a fritted refractory composition that is solid at the operating temperature of said structure, said particles consisting essentially of cores of silicon carbide enveloped in coatings of refractory glaze material composed predominantly of metallic oxides that melt at the temperature imparted to said spray in said flame, melting said particles, at least in part, as they pass through said flame, and congealing the sprayed particles together as they accumulate on said structure to form a dense solid patch thereon.

9. The method of patching a heated solid refractory structure, as in a furnace chamber normally heated to a temperature in the range of approximately 2200 to 2550° F., which comprises directing onto said structure through an oxy-acetylene flame a spray of finely divided particles of a fritted refractory composition that is solid at the normal temperature of said chamber, said particles consisting essentially of cores of silicon carbide enveloped in coatings of refractory glaze material composed predominantly of metallic oxides and itself melting at a temperature in the range of 1600 to 3300° F., said composition being molten at a temperature of approximately 3200 to 3500° F. and solidified from molten condition at a temperature in the range of 2200 to 2800° F., melting said particles, at least in part, as they pass through said flame, and congealing the sprayed particles together as they accumulate on said structure to form a dense solid patch thereon.

10. The method of patching a heated solid refractory structure, as in a furnace chamber normally heated to a temperature in the range of approximately 2200 to 2550° F., which comprises directing onto said structure through an oxy-acetylene flame a spray of finely divided particles of a fritted refractory composition that is solid at the normal temperature of said chamber, said particles consisting essentially of cores of silicon carbide enveloped in coatings of refractory glaze material composed predominantly of $SiO_2$ and $Al_2O_3$, said composition being molten at a temperature of approximately 3200 to 3500° F. and solidifying from molten condition at a temperature of approximately 2600 to 2800° F., melting said particles, at least in part, as they pass through said flame, and congealing the sprayed particles together as they accumulate on said structure to form a dense solid patch thereon.

References Cited in the file of this patent

UNITED STATES PATENTS

| Number | Name | Date |
|---|---|---|
| 1,125,741 | Schwarz | Jan. 19, 1915 |
| 2,011,498 | Miller | Aug. 13, 1935 |
| 2,108,998 | Schori | Feb. 22, 1938 |
| 2,407,725 | Schoenlaub | Sept. 17, 1946 |
| 2,499,729 | Daussan | Mar. 7, 1950 |
| 2,504,185 | Debenham | Apr. 18, 1950 |
| 2,726,118 | Jones et al. | Dec. 6, 1955 |
| 2,766,129 | Marcowka | Oct. 9, 1956 |

FOREIGN PATENTS

| Number | Country | Date |
|---|---|---|
| 175,156 | Canada | Feb. 20, 1917 |
| 402,203 | Great Britain | Nov. 30, 1933 |